United States Patent [19]

Rydborn

[11] 4,455,549
[45] Jun. 19, 1984

[54] INDICATION DEVICE

[76] Inventor: Sten Å. Rydborn, Klöxhultsvägen 21, 343 00 Älmhult, Sweden

[21] Appl. No.: 306,975

[22] Filed: Sep. 29, 1981

[51] Int. Cl.³ .................. G08B 23/00; D01H 13/16
[52] U.S. Cl. .................. 340/517; 340/500;
340/506; 340/523; 340/677; 57/81; 19/300;
28/185; 28/186; 28/188; 66/161; 66/163;
226/10; 226/11; 226/45; 242/37 R
[58] Field of Search ........... 340/517, 506, 523, 500,
340/501, 511, 507, 522, 679, 668, 675, 677,
309.15, 521; 57/81; 139/370.2, 353; 73/160;
307/116, 117; 226/10, 11, 12, 45; 19/23, 300;
28/185, 186, 187, 188, 189; 242/36, 37 R;
66/157-161, 162, 163

[56] References Cited
U.S. PATENT DOCUMENTS

| | | | |
|---|---|---|---|
| 3,133,276 | 5/1964 | Miller et al. | 340/517 |
| 4,060,965 | 12/1977 | Schwartz | 340/677 |
| 4,140,919 | 2/1979 | Rydborn | 340/677 |
| 4,267,554 | 5/1981 | Loepfe et al. | 340/677 |

Primary Examiner—Donnie L. Crosland
Attorney, Agent, or Firm—Beveridge, DeGrandi & Kline

[57] ABSTRACT

A device for indicating the triggering of a signal transducer in, for example, thread surveillance and monitoring systems. In one device according to the present invention, the signal transducers are, on the one hand, coupled in series by means of lines between the signal transducers and, on the other hand, coupled in parallel by means of one signal line, and each one of the signal transducers is provided with first circuitry which is operative, in response to the occurrence of a signal from the transducer, to generate a control signal which is fed to the immediately subsequent signal transducer in the series coupling, this transducer having, like the remainder, second circuitry for generating, in response to the control signal, a deviation in the transducer signal and a further control signal which is fed to the immediately subsequent signal transducer in the series coupling, whereby there occurs, on the signal line, a transducer signal having a deviation for each one of the signal transducers between the transducer generating the transducer signal and one end of the signal line.

6 Claims, 7 Drawing Figures

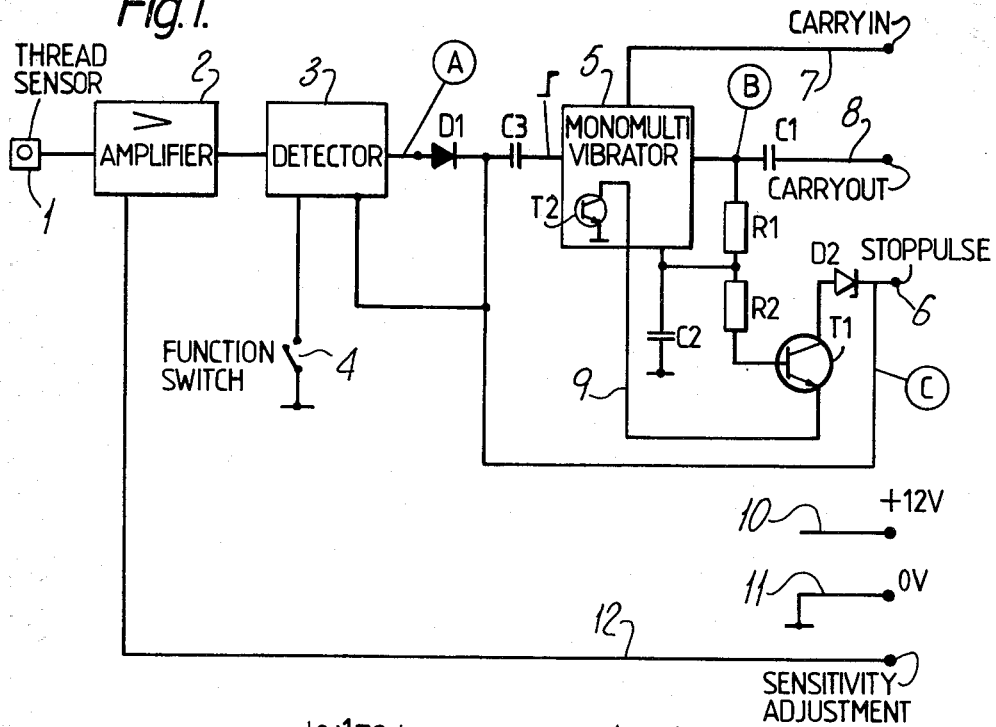
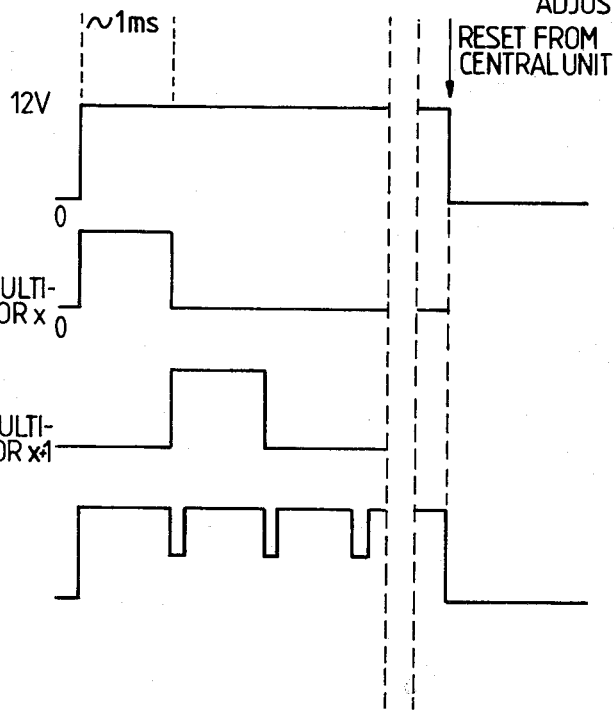

INDICATION DEVICE

BACKGROUND OF THE INVENTION

The present invention relates to a device for use in a monitoring system having a multiplicity of transducers, each generating a signal corresponding to an event to which the transducer is responsive, for example, a fault of some type. More particularly, the present invention relates to a device incorporated into such a monitoring system to indicate which signal transducer has emitted a signal.

In prior art surveillance systems having different types of signal transducers, a signal from a transducer is indicated in different manners. Examples of indicators are lamps, instruments, alarm devices or the like, which are connected to separate transducers and which are normally placed centrally in an operating panel or the like. Thus, one indication line is required for each transducer, and a large number of transducers requires as large a number of indicator lines, at least in those cases where it is desirable to monitoring each one of the transducers. The wiring for such a system must, obviously, be extensive, and such systems are, as a result, costly, sensitive to disturbance and complicated.

This is particularly valid in thread surveillance systems for spinning machines, yarn frames, texturizing machines etc. in which a very great number of threads is to be monitored. In a number of such machines it is desirable to monitor a hundred threads, or more. Furthermore, when a fault occurs, it is desirable to obtain an indication of the faulty thread or the triggering thread sensor.

SUMMARY OF THE INVENTION

The present invention is a device for indicating a triggering signal transducer in a simple and efficient manner, it being, moreover, possible to utilize the device for satisfying the above-mentioned desires within the art in thread monitoring systems.

The above-disclosed task is solved according to the present invention which is characterised in that the signal transducers are coupled in series by means of lines between the signal transducers, and also are coupled in parallel by means of one signal line, and in that each one of the series-coupled signal transducers is provided with first circuit means which are operative, in response to the occurrence of a signal from the transducer, to generate a control signal which is fed to the immediately subsequent signal transducer in the series coupling, this transducer having, like the remainder, second circuit means for generating, in response to the control signal a deviation in the transducer signal, and a further control signal which is fed to the subsequent signal transducer in the series coupling, whereby there is generated, on the signal line, a transducer signal having a deviation for each one of the signal transducers between the transducer generating the transducer signal and one end of the signal line. The first and second circuit means include a monostable multivibrator which is switchable by means of, on the one hand, a transducer signal, and, on the other hand, a control signal. The multivibrator has two signal inputs and two signal outputs. One input is coupled to the transducer and the other input is coupled to one output of the multivibrator of the immediately preceding signal transducer in the series coupling. One output of the multivibrator is coupled to the signal line and the second output to the second input of the multivibrator of the immediately preceding signal transducer in the series coupling. Furthermore, circuit means are disposed between the outputs of the multivibrators to generate, in the form of a deviation in the transducer signal, a counting pulse in response to a control signal on the second input of each multivibrator.

The device according to the presnt invention allows for the employment of a great number of transducers irrespective of the wiring involved. Thus, the number of indicatable transducers is optional and is independent of the wiring. All transducers may be identical and need not be coded in any manner. Furthermore, the device according to the present invention allows for optional engagement and disengagement of transducers. Moreover, the device according to the present invention permits extremely simple computor processing of the transducer signals for, for example, individual monitoring for establishing systematic faults, this being of special interest in thread monitoring systems for establishing systematic faults as a result of yarn quality, wear, incorrect adjustment, and so on.

BRIEF DESCRIPTION OF THE DRAWINGS

The nature of the present invention and its aspects will be more readily understood from the accompanying drawings and the discussion relating thereto.

In the accompanying drawings:

FIG. 1 is a block diagram of a thread sensor according to one embodiment of the present invention;

FIGS. 2(a)–2(d) depict waveforms found at various points in the circuit of FIG. 1;

DETAILED DESCRIPTION OF A PREFERRED EMBODIMENT OF THE INVENTION

Figure 3:
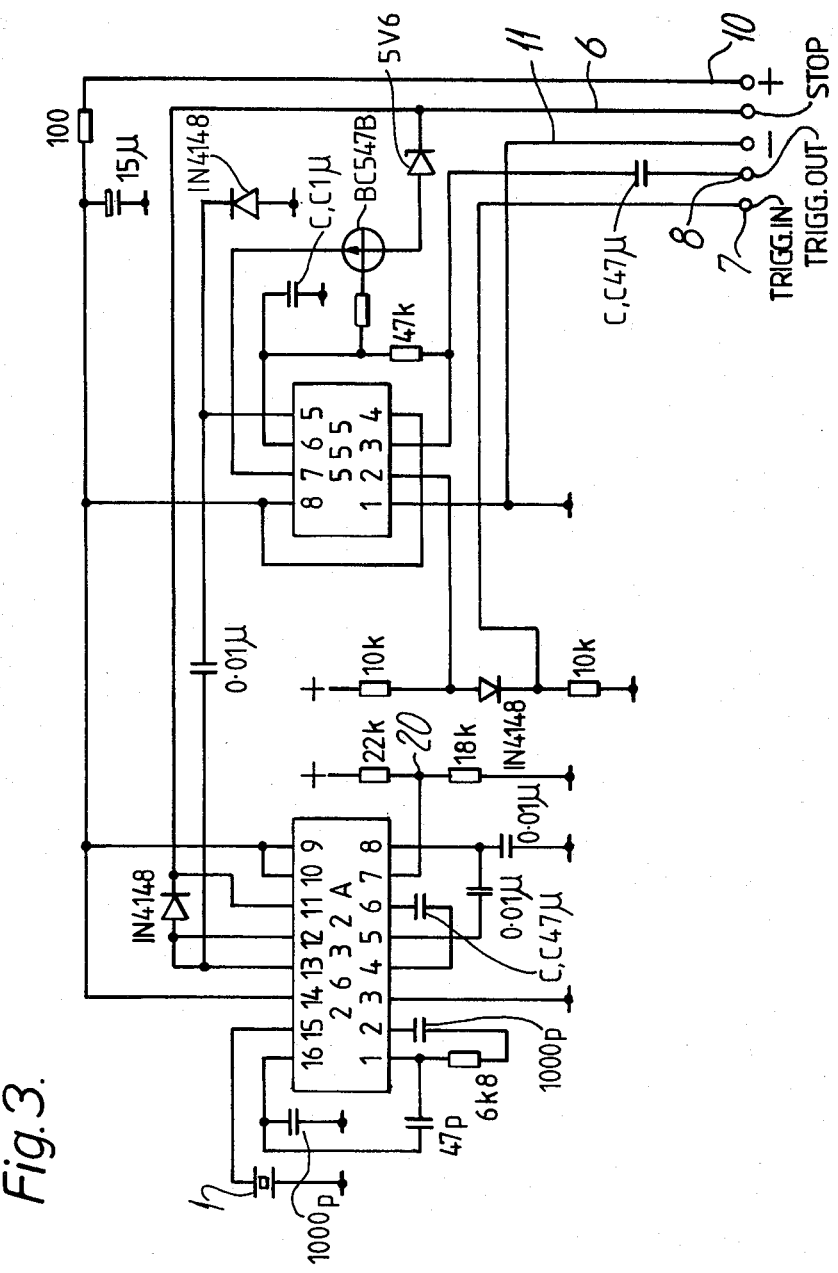
FIG. 3 is a circuit diagram of a construction of one device according to the present invention.

A device according to the present invention is usable in practically all surveillance systems where it is desirable to establish which one of a great number of transducers is emitting a signal. The preferred embodiment of the present invention described below is, however, particularly intended for use in conjunction with multi-thread surveillance.

FIG. 1 illustrates a block diagram of one embodiment of the device according to the present invention which is intended to monitor a thread in a spinning machine, yarn frame, texturising machine or the like. In such a machine, there is provided one device of the type illustrated in FIG. 1 for each thread. FIGS. 2(a) through 2(d) are pulse diagrams of various points in FIG. 1.

The device comprises essentially a thread sensor 1 which may be of the piezoelectric type may responsive to thread movement of a speed of 30 m/min and more. The signal generated on thread movement at the above-given speed is fed to an amplifier 2 and then to a detector 3. Detector 3 is provided with a function switch 4 for switching detector 3 between a state in which it emits a detector signal when the signal from thread sensor 1 stop, and another state in which it emits a signal in response to the signal from thread sensor 1. In certain cases, it is desirable to be able to sense a break in a thread, and in certain cases it may be desirable to sense the occurence of thread movement.

With switch 4 in the illustrated, open position, detector 3 is enabled to emit a signal when the signal from thread sensor 1 stops. Detector 3 is coupled to a monostable multivibrator or one-shot 5 by means of a diode D1 and a capacitor C3. Furthermore, detector 3 is coupled to a stop pulse output terminal 6. Stop pulse output terminal 6 is further coupled to the junction of diode D1 and capacitor C3. One-shot 5 includes a transistor T2 and can, alternatively, be of any conventional type. One-shot 5 has, furthermore, a control signal input terminal 7 and a control signal output terminal 8. A capacitor C1 is coupled between one-shot 5 and the control signal output terminal 8, the connection between one-shot 5 and capacitor C1 being coupled to the base of a transistor T1 by means of two series-connected resistors R1 and R2. The collector of transistor T1 is coupled to stop pulse output terminal 6 by a Zener diode D2 and the emitter of transistor T1 is coupled to the collector of transistor 12 in one-shot 5 by line 9. The junction of resistors R1 and R2 is connected to one-shot 5 and is coupled to ground or a zero reference voltage level by means of a capacitor C2. The device in FIG. 1 is supplied with a voltage at +12 V via an input 10 and with a ground or zero reference voltage level via an input 11. There is a further line 12 coupled to amplifier 2 to provide a sensitivity adjustment control signal thereto.

A signal from thread sensor 1 is amplified in amplifier 2 and fed to detector 3. When function switch 4 is in the illustrated open position, detector 3, on discontinuation of the signal from thread sensor 1, applies a signal A to diode D1 and to stop pulse output terminal 6. Signal A is shown in greater detail in the pulse diagram of FIG. 2(a) and is a signal of +12 V. Signal A lasts until such time as a reset is effected from a central surveillance unit which is illustrated in greater detail in FIG. 4. The purpose of signal A may be to stop the machine on the occurrence of a break in the thread which is monitored by thread sensor 1. Signal A passes also to one-shot 5 which is triggered by signal A, the so-called fault signal. When the fault signal A triggers one-shot 5, the one-shot emits a signal B which is applied to control signal output terminal 8 by means of capacitor C1. As will be apparent to the skilled reader of the pulse diagram of FIG. 2(b), signal B is a positive signal. Transistor T2 in one-shot 5 is non-conductive. Capacitor C2 is charged by signal B through resistor R1, and when capacitor C2 has been charged to a predetermined level, transistor T2 becomes conductive, whereby transistor T1 also becomes conductive to cause capacitor C2 to discharge through resistor R2. This causes Zener diode D2 to lower the level of signal A on stop pulse output terminal 6. In the present embodiment, the level of signal A is lowered to about 6 V, and this gives rise to a negative counting pulse on stop pulse output terminal 6.

In the pulse diagram of FIG. 2(d), stop pulse C is shown with a number of counting pulses. In a surveillance system, all devices according to FIG. 1 are interconnected in such a manner that all stop pulse output terminals 6 are interconnected with a stop signal line, and each output terminal 8 leads to the control signal input terminal 7 of the immediately subsequent one-shot 5, and so each control signal input terminal 7 is coupled to the control signal output terminal 8 of the immediately preceding one-shot. The supply inputs 10 and 11, as well as the sensitivity adjustment input 12, are also coupled in parallel.

The signal B on the control signal output terminal 8, thus, is fed to the control signal input terminal 7 of the immediately subsequent one-shot 5. This immediately subsequent one-shot is triggered and emits, on its output terminal 8, a signal (B) shown in FIG. 2(c), which is accordingly identical to the signal B of FIG. 2(b) but is shifted in time. Since all the stop pulse output terminals 6 are interconnected with a stop pulse line, this signal (B) gives rise to the second counting pulse in the stop pulse signal C of FIG. 2(d). The immediately subsequent one-shot 5 in the series coupling gives rise to the third counting pulse in the stop pulse signal C. In this manner, each one-shot in the series coupling after that one-shot whose detector 3 has emitted a signal A, gives rise to a counting pulse in the stop pulse signal C.

As soon as the counting pulse has been generated in the stop pulse signal C, the signal B ends, which results in a negative signal or pulse on the control signal output 8, this pulse causing the subsequent one-shot 5 to be triggered to give rise to a stop pulse signal.

Figure 4:
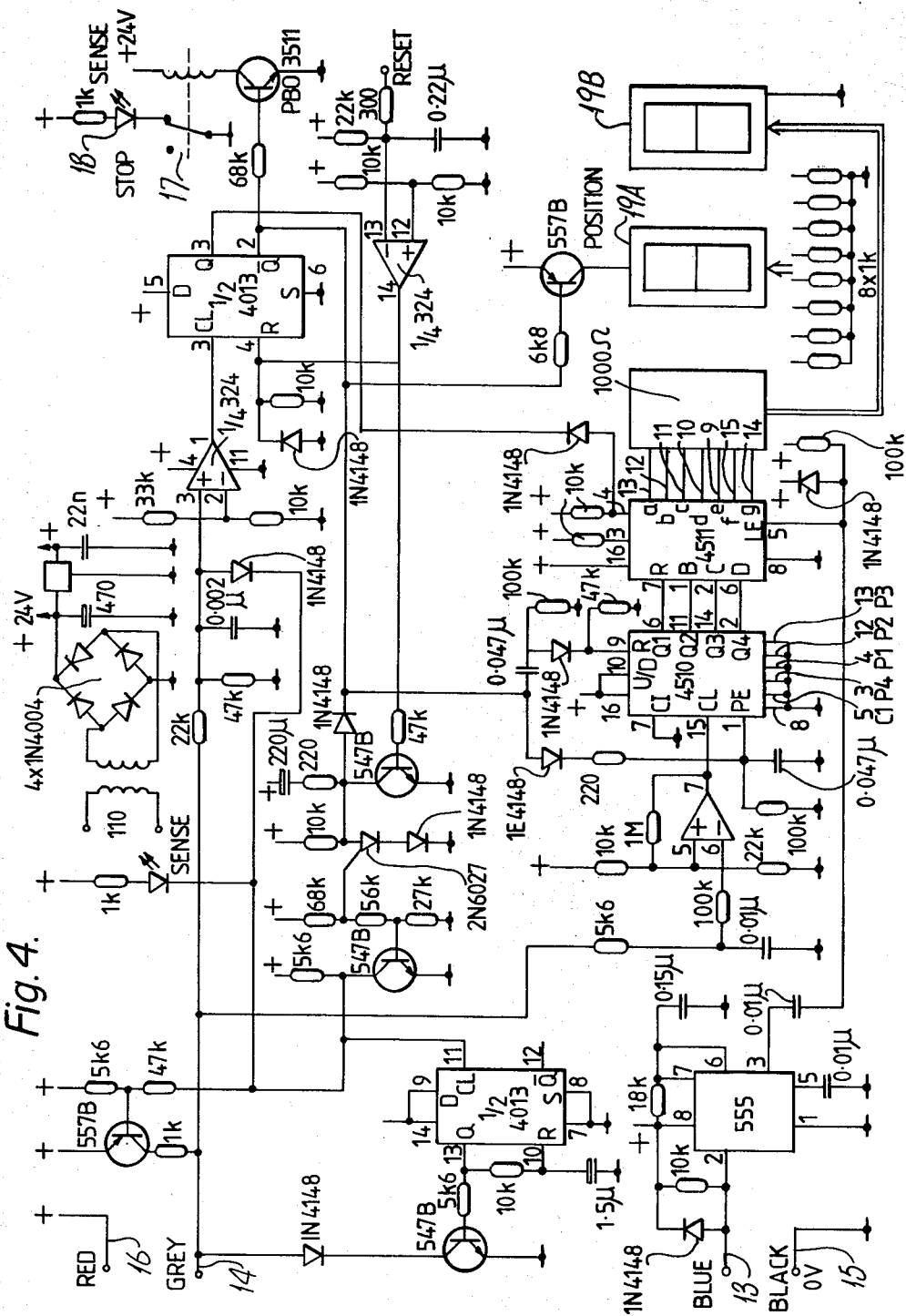
FIG. 4 is a diagram of one embodiment of a central unit for a monitoring and surveillance system according to the present invention.

When the control signal on output terminal 8 has passed the last monomultivibrator and, thereby, the last signal transducer in the series coupling, it is fed into a central unit which may be of the construction illustrated in FIG. 4. The control signal output terminal 8 of the last one-shot 5 is coupled to the input 13 of the central unit, and the stop pulse output terminals 6 are coupled to the input 14. The zero reference voltage or ground is coupled to input 15, and +12 V is coupled to input 16.

In the present case, the central unit of FIG. 4 is operative on the one hand to react to the stop pulse C properly by switching of a relay 17 which, on switching by means of a stop pulse signal C, lights a light-emitting diode 18 and can cause the machine to stop, if desired. Furthermore, the central unit of FIG. 4 is operative to count the number of counting pulses in the stop pulse signal C, whereupon the number of counting pulses is indicated by means of a numerical indicators 19A and 19B. Indicator 19A shows hundreds and indicator 19B shows single numbers. The circuits shown in the central unit according to FIG. 4 may be per se conventional and so are be described in greater detail here.

FIG. 3 illustrates a construction of a device according to the present invention as depicted in FIG. 1 with the help of so-called integrated or IC circuits. In the circuit illustrated in FIG. 3, the amplifier and detector are built-in to a so-called interdesign circuit 2632A, while one-shot 5 is made up of an IC circuit 555. If it is desired to provide central amplification control or sensitivity adjustment, lead 12 shown in FIG. 1 is coupled to the point 20 in FIG. 3. If the circuit means are provided with a function switch 4, this is to be coupled to the input 10 on the 2632A circuit of FIG. 3. Otherwise, the circuit means of FIG. 3 are coupled in the same manner as the device illustrated in FIG. 1.

As a result of the present invention, it is possible to construct thread surveillance and monitoring systems for monitoring several hundred threads at the same time. This is primarily because the surveillance section components 1, 2, 3, and 5 may be made very small and at a reasonable cost. As had been pointed out, it is difficult in prior art systems to receive information as to which of the threads has caused a triggering. This problem is solved according to the present invention, by means of which it is possible to identify an unlimited number of transducers. The device according to the present invention also allows for extremely simple checking that all of the transducers in the system are activated and also how many transducers are included in the system, in that a control signal may be impressed upon the first transducer on the input terminal 7, whereafter a number of counting pulses is obtained which corresponds to the number of transducers. The counter in the central unit illustrated in FIG. 4 may be replaced by a computer or even supplemented by a computer or some other medium for processing the stop pulse signal C for statistics and follow-up of the number of triggerings and possibly for establishing which thread or threads most often cause the triggering.

Naturally, the invention described above is not restricted merely to thread surveillance and monitoring, but may very well be employed in other surveillance contexts with a large number of signal triggering units.

I claim:

1. A signaling system for a plurality of transducer elements comprising:

a plurality of transducer circuits, each including a signal input terminal adapted for connection to a transducer element for receipt therefrom of a transducer input signal indicative of an event for which the transducer element is responsive, a signal output terminal, a control input terminal, a control output terminal, and circuit means responsive to receipt of a transducer input signal on said signal input terminal for generating a transducer output signal on said signal output terminal and a control output signal on said control output terminal and responsive to receipt of a control input signal on said control input terminal for generating a deviation in any transducer output signal then present on said signal output terminal and generating a control output signal on said control output terminal;

a control line including means coupling the control output terminal of each of said transducer circuits to the control input terminal of an adjacent transducer circuit to couple all of said transducer circuits in series;

a signal line including means coupling said signal line to the signal output terminal of each of said transducer circuits to couple all of said transducer circuits in parallel;

whereby in response to detection of an event by a transducer element, there appears on said signal line a transducer output signal including a number of deviations equal to the number of transducer circuits in the series connection between the transducer circuit associated with the transducer element that detected the event and the last transducer circuit in the series connection.

2. The system as recited in claim 1, wherein said circuit means comprises a monostable multivibrator which is switchable to its unstable state by means of a transducer input signal on said transducer circuit signal input terminal and by means of a control input signal on said transducer circuit control input terminal.

3. The system as recited in claim 2, wherein the multivibrator has a first input adapted to be coupled to the transducer element, a second input coupled to the control output of the immediately preceding transducer circuit in the series coupling, a first output coupled to the signal line, and a second output coupled to the control input of the immediately subsequent transducer circuit in the series coupling.

4. The system as recited in claim 2, wherein said circuit means includes means for generating as the deviation in the transducer output signal, a counting pulse in response to each control input signal.

5. The system as recited in claim 1, wherein said circuit means generates as the deviation in the transducer output signal a counting pulse in response to each control input signal on the transducer circuit control input terminal.

6. The system as recited in claim 3, wherein said circuit means includes means disposed between the outputs of the multivibrator for generating, as the deviation in the transducer output signal, a counting pulse in response to each control signal on the second input of the multivibrator.

* * * * *